Patented Jan. 31, 1950

2,496,114

UNITED STATES PATENT OFFICE 2,496,114

PURIFICATION OF NICOTINAMIDE

James Raymond Berg, Detroit, Mich., assignor, by mesne assignments, to R. P. Scherer Corporation, a corporation of Michigan No Drawing. Application October 8, 1945, Serial No. 621,165

5 Claims. (Cl. 260—295.5)

The present invention relates to the purification of nicotinamide and is more particularly concerned with the purification of nicotinamide which is contaminated with nicotinic acid.

The major problem in the production of nicotinamide has been the preparation of this vitamin substantially free from contaminating nicotinic acid, the inability to effect a separation being due to the almost identical solubility characteristics of nicotinamide and nicotinic acid.

Naturally, attempts have been made heretofore to remove nicotinic acid from the mixture. Although there is some difference in solubility characteristics with respect to water, purification by this means has not been feasible because of the exceptionally high water solubility of nicotinamide. Some purification can be obtained by re-crystallization from alcohol, but this procedure is difficult, time-consuming and not readily adaptable to plant operation. All other known procedures to separate these compounds by fractional recrystallization or by specific solvent action are not even well suited for laboratory purification, much less for purification on a plant scale. Similarity of the two compounds with regard to their crystallizing properties does not permit a ready purification by this method.

Attempts have also been made to form various water insoluble salts of nicotinic acid in order to effect the separation. The usual water insoluble salts of some acids, such as the calcium and barium salts, are, in the case of nicotinic acid, quite water-soluble, and hence resort has been made to the use of comparatively expensive salts to produce water-insoluble salts of nicotinic acid.

A method has been described for this purification in which the calcium salt of nicotinic acid is prepared and the nicotinamide removed by acetone or isopropyl alcohol extraction from the previously dried material, but this method has proved not only time-consuming but not productive of particularly good yield of nicotinamide.

It has now been found, in accordance with the present invention, that the contaminant nicotinic acid may be very effectively separated from nicotinamide—nicotinic acid mixtures by suspending the mixture in a non-aqueous solvent and treating it with an amine which is non-reactive to the nicotinamide but which is reactive to the nicotinic acid to form therewith an amine salt soluble in the non-aqueous solvent. The unreacted and undissolved nicotinamide is then simply filtered, washed, and obtained in practically 100% purity. The nicotinic acid in the form of the amine salt remains in solution in the non-aqueous solvent and can be isolated, purified and used as such, or it may be reconverted to nicotinic acid.

A wide variety of non-aqueous solvents and amines may be employed to effect this purification.

Non-aqueous solvents found to be effective are benzene, toluene, cyclohexane, cyclohexene, diethyl ether, petroleum ether, hexane, and methyl cyclohexane.

Amine effective to form amine salts of nicotinic acid soluble in non-aqueous solvents of the foregoing character are selected from the class of primary and secondary amines of the aliphatic, aromatic or heterocyclic series possessing highly reactive amine groups. Examples of such amines are ethylamine, isopropylamine, N-butylamine, diethylamine, diisopropylamine, morpholine, piperidine, cyclohexylamine, aniline, benzylamine and alcohol amines, such as ethanolamine, diethanolamine, monoisopropanolamine, and 4-amino-2-butanol.

While the foregoing non-aqueous solvents are of general applicability in the purification process, it should be pointed out that they are not entirely interchangeable for one another in any given application since the various nicotinic acid amine salts formed from various amines have somewhat different solubility characteristics. For instance, the N-butylamine salt of nicotinic acid is a heavy yellow oil which is soluble in water, diethyl ether, alcohols, benzene and cyclohexane, but is insoluble in hexane and petroleum ether. Thus, if N-butylamine is used in the purification process, benzene, diethyl ether and cyclohexane may be used as non-aqueous solvents but hexane and petroleum ether are not suitable.

Naturally, however, it is within the scope of the invention to employ any amine effective to form a nicotinic acid amine salt which is soluble in a given non-aqueous solvent so long as the solvent chosen is incapable of dissolving or reacting with nicotinamide.

The following specific examples, which are given by way of illustration and not by limitation, will serve as an aid in the practice of the invention:

*Example 1*

85 grams of nicotinamide and 15 grams of nicotinic acid are thoroughly mixed in 300 cc. of benzene. 15 cc. of piperidine are added and the whole brought to the boil and maintained at this temperature for several hours to cause the formation of the amine salt. The reaction mass is then filtered and the precipitate washed with an appropriate solvent and dried. The yield of pure nicotinamide assaying 99.17% nicotinamide and 0.15-0.25% nicotinic acid is 82 grams. The corresponds to an actual recovery of 96.5% pure nicotinamide based on the actual nicotinamide present. The benzene filtrate and washings may be evaporated to dryness, the benzene recovered for further purification, and the residue purified by recrystallization.

*Example 2*

100 grams of impure nicotinamide assaying 93% nicotinamide and 7% nicotinic acid are heated to reflux for several hours with agitation in a mixture of 300 cc. benzene and 15 cc. of normal butylamine. The nicotinamide isolated as in Example 1 weighs 91 grams and assays 99.64% nicotinamide and 0.22% nicotinic acid. This is a recovery of 98% of the actual nicotinamide present as material suitable for pharmaceutical purposes.

*Example 3*

100 grams nicotinamide assaying 93% nicotinamide and 7% nicotinic acid are treated as in Example 2 with 300 cc. benzene and 13 cc. morpholine. 90 grams of pure nicotinamide assaying 99% nicotinamide and 0.3% nicotinic acid are obtained. This is a recovery of 96.5% pure usable nicotinamide.

*Example 4*

20 lbs. of nicotinamide assaying 91% nicotinamide and 8.5% nicotinic acid are caused to react with 1½ lbs. of diethyl amine in 10 gallons of benzene. After the reaction is complete, the insoluble nicotinamide is removed by filtration and washed with benzene and diethyl ether. The resulting 18 lbs. of nicotinamide assayed 99.7% nicotinamide and 0.3% nicotinic acid.

It will be observed that the foregoing procedure is a very simple one and is one which is readily adaptable, on a plant scale, for the purification of nicotinamide contaminated with nicotinic acid. An exceptionally high recovery of substantially pure nicotinamide is readily effected at minimum cost and labor. Actually, the only costs of purification are labor and purely mechanical losses. Practically all of the nicotinamide is recovered as such, the non-aqueous solvents employed are recoverable for re-use, and the nicotinic acid is isolated in a form in which it may be used as such or may be readily converted to pure nicotinic acid.

What is claimed is:

1. A process for purifying nicotinamide contaminated with nicotinic acid which comprises suspending the impure nicotinamide in a hydrocarbon solvent, treating the suspension with an amine inert to nicotinamide but reactive with nicotinic acid to form a nicotinic acid amine salt which is soluble in said solvent, said amine being taken from the group consisting of primary and secondary alkylamines, cyclohexylamines, primary aromatic amines, primary and secondary alkylolamines, aralkylamines, morpholine, and piperidine, and recovering the undissolved and unreacted nicotinamide.

2. A process for purifying nicotinamide contaminated with nicotinic acid which comprises suspending the impure nicotinamide in benzene, treating the suspension with an amine inert to nicotinamide but reactive with nicotinic acid to form a nicotinic acid amine salt which is soluble in benzene, said amine being taken from the group consisting of primary and secondary alkylamines, cyclohexylamines, primary aromatic amines, primary and secondary alkylolamines, aralkylamines, morpholine, and piperidine, and recovering the undissolved and unreacted nicotinamide.

3. A process for purifying nicotinamide contaminated with nicotinic acid which comprises suspending the impure nicotinamide in benzene, treating the suspension with piperidine which is inert to nicotinamide but which forms nicotinic acid piperidine salt which is soluble in benzene, and recovering the undissolved and unreacted nicotinamide.

4. A process for purifying nicotinamide contaminated with nicotinic acid which comprises suspending the impure nicotinamide in benzene, treating the suspension with N-butyl amine which is inert to nicotinamide but which forms nicotinic acid N-butyl salt which is soluble in benzene, and recovering the undissolved and unreacted nicotinamide.

5. A process for purifying nicotinamide contaminated with nicotinic acid which comprises suspending the impure nicotinamide in benzene, treating the suspension with morpholine which is inert to nicotinamide but which forms nicotinic acid morpholine salt which is soluble in benzene, and recovering the undissolved and unreacted nicotinamide.

JAMES RAYMOND BERG.

REFERENCES CITED

The following references are of record in the file of this patent:

UNITED STATES PATENTS

| Number | Name | Date |
|---|---|---|
| 2,233,419 | Moore | Mar. 4, 1941 |
| 2,280,040 | Seibert | Apr. 14, 1942 |